(12) United States Patent
Nonomura et al.

(10) Patent No.: US 6,263,428 B1
(45) Date of Patent: Jul. 17, 2001

(54) BRANCH PREDICTOR

(75) Inventors: Yo Nonomura, Yokohama; Sumio Kikuchi, Machida, both of (JP)

(73) Assignee: Hitachi, LTD, Tokyo (JP)

( * ) Notice: Subject to any disclaimer, the term of this patent is extended or adjusted under 35 U.S.C. 154(b) by 0 days.

(21) Appl. No.: 09/087,509

(22) Filed: May 29, 1998

(30) Foreign Application Priority Data

May 29, 1997 (JP) .................................................. 9-139736

(51) Int. Cl.$^7$ ........................................................ G06F 9/32
(52) U.S. Cl. .................................................................. 712/239
(58) Field of Search .................................... 712/239, 237

(56) References Cited

U.S. PATENT DOCUMENTS

| | | | | |
|---|---|---|---|---|
| 4,764,861 | * | 8/1988 | Shlbuya | 712/207 |
| 5,642,493 | * | 6/1997 | Burgess | 712/237 |
| 5,898,865 | * | 4/1999 | Mahalingalah | 712/239 |
| 5,909,573 | * | 6/1999 | Sheaffer | 712/240 |

OTHER PUBLICATIONS

T. Yeh, et al, "Two–level Adaptive Training Branch Prediction", Proceedings of the 24$^{th}$ Annual International Symposium on Micro–architecture, 1991, pp. 51–61.

M. Wolfe, "High Performance Computers for Parallel Computing", Addison–Wesley Publishing Company 1996, ISBN 0–8053–2730–4, pp. 200–201.

\* cited by examiner

*Primary Examiner*—David Y. Eng
(74) *Attorney, Agent, or Firm*—Antonelli, Terry, Stout & Kraus, LLP

(57) ABSTRACT

A branch predictor for predicting an instruction to be executed next to a conditional branch instruction in a program to read the predicted instruction beforehand. The branch predictor includes a hint acquisition section for acquiring a hint when a specified instruction controlling acquisition of the hint is executed wherein said hint indicates whether a branch is to be taken by execution of a conditional branch instruction with which termination of a loop is judged. The branch predictor further includes a hint store section for storing the hint acquired by the hint acquisition section, and an instruction read section for reading an instruction predicted as executed next to a conditional branch instruction in accordance with the hint stored in the hint store section. According to the invention it is possible to accurately predict a branch at the time of loop termination of the loop termination judging conditional branch instruction.

5 Claims, 9 Drawing Sheets

BRANCH PREDICTOR

BACKGROUND OF THE INVENTION

The present invention relates to a branch predictor for predicting the presence of a branch in a branch instruction, and more particularly to a technique which is effective when it is applied to a branch predictor making the prediction of whether or not a branch is to be taken by a conditional branch instruction with which the judgement is made as to whether or not a loop processing is to be iterated.

Recent microprocessors have remarkable improvements in speed. It is general in these microprocessors that the deep-pipeline execution or the out-of-order execution (in which the execution of a successor instruction is started without waiting for the completion of the execution of a predecessor instruction) is made or a cache memory is used. Though those techniques are effective, the performance is degraded in the following cases.

Namely, the pipeline execution and the out-of-order execution are effective in the case where a continuous train of instructions are to be executed. In many instances, however, a large penalty is imposed in the case where the continuity is destroyed owing to a conditional branch instruction. Accordingly, the performance is degraded in the case where a branch is generated by a conditional branch instruction.

As to the improvement in speed by the use of the cache memory, on the other hand, an instruction cache miss is generated in the case where the reference to an instruction included in no cache memory is made in a program. The generation of the instruction cache miss causes the degradation in speed.

For such circumstances, the possession of a mechanism for predicting whether or not a branch is to be taken by a conditional branch instruction is a primary issue of late. Especially, a method disclosed in the article by Tse-Yu Yeh and Yale N. Patt, "Two-Level Adaptive Training Branch Prediction", Proceedings of the 24th Annual International Symposium on Microarchitecture, 1991, pp. 51–61 is widely used in view of the accuracy of prediction. In the disclosed method, there is prepared a branch information table which includes the record of what branch was taken for each conditional branch instruction (the record showing the presence of previous branch execution will hereinafter be referred to as branch history information). On the basis of the record, the prediction is made as to whether or not a branch is to be taken at the time of next execution of that conditional branch instruction.

In the method disclosed by the above article, the branch history information includes only the branch execution history record of the last branches up to several. times the amount of the last branches at the most. Therefore, this method has a disadvantage in that it is difficult to predict the result of execution of a conditional branch instruction making an operation in which a branch is taken to a certain branch target address some times and the next instruction is thereafter executed with no branch being taken only one time. Such an operation appears in the most conditional branch instructions with which the judgement is made as to whether or not a loop is to be iterated in a loop portion included in a program. For such a conditional branch instruction, it is difficult to predict a branch at the time of termination of a loop after the iterative execution thereof. Therefore, the prediction in the case of loop termination results in a miss always.

SUMMARY OF THE INVENTION

An object of the present invention is to solve the above-mentioned problem, thereby providing a branch predictor which is capable of making the accurate prediction of a branch at the time of loop termination in a conditional branch instruction with which the judgement of loop termination is made.

In a branch predictor of the present invention for predicting an instruction to be executed next to a conditional branch instruction in a program to read the predicted instruction beforehand, there is acquired a hint indicating whether or not a branch is to be taken by the execution of a conditional branch instruction with which the judgement of loop termination. An instruction predicted as executed next to a conditional branch instruction is read in accordance with the hint.

In the present invention, there are prepared, in addition to a branch prediction mechanism based on ordinary branch history information, hint acquisition control means for controlling the acquisition of a hint indicating whether or not a branch is to be taken by the execution of a conditional branch instruction with which the termination of a loop is judged, hint acquisition means for acquiring, the hint indicating whether or not a branch is to be taken, in accordance with the value of a certain register, for example, a loop counter register (hereinafter referred to as CTR), hint store means for storing the hint, and instruction read means for reading an instruction predicted as executed next to a conditional branch instruction in accordance with the hint. With the use of these means, an accurate prediction is made as to whether a branch is to be taken by a conditional branch instruction with which the judgement of loop termination is made.

The hint acquisition control means makes upon compilation the determination and designation of whether the value of the above-mentioned hint or a prediction result by the branch prediction mechanism based on ordinary branch history information should be used as the predictor of whether a branch is to be taken by a conditional branch instruction. With this designation, the accurate prediction is made as to whether a branch at the time of loop termination is to be taken by a conditional branch instruction with which the judgement of loop termination is made.

The CTR is set with a specified value at the time of start of a loop in a program and is updated during the iterative operation of the loop. In the case where the CTR takes a value which satisfies a specified condition, the loop is terminated.

The hint acquisition means makes, in accordance with the value of the CTR, the prediction of whether a branch is to be taken by a conditional branch instruction with which the judgement of loop termination is made. The result of prediction is recorded as a hint bit in a branch hint table which is the hint store means.

In the case where a loop trip count is known at the time of loop start, the value of the loop trip count is set to the CTR, for example, at the time of loop start. In this case, the value of the CTR is decremented each time a conditional branch instruction for looping is executed and the CTR takes 0 at the time of loop termination. At this time, it is possible to determine the value of the hint bit by making predictions while taking notice of, for example, a change in value of the CTR as shown in the following.

(1) In the case where the value of the CTR is larger than 1, the CTR will not take 0 at the time of next execution of the loop termination judging conditional branch instruction and hence the control can be predicted as turned to an instruction address with which the loop is iterated.

(2) In the case where the value of the CTR is 1, the CTR will take 0 at the time of next execution of the loop termination judging conditional branch instruction and hence the control can be predicted as turned to an instruction address with which the loop is terminated.

In the case where the value of the CTR is 1 in the above example, the hint acquisition means predicts the control as turned to an instruction address with which the loop is terminated, so that a hint indicating that the loop is to be terminated is recorded into the hint bit of the branch hint table.

The instruction read means reads, in accordance with the value of the hint bit in the branch hint table, an instruction predicted as executed next to a conditional branch instruction with which the judgement of loop termination is made.

With the prediction of whether or not a branch is to be taken by a conditional branch instruction with which the judgement of loop termination is made, as mentioned above, it is possible to reduce the delay of the installation to a pipeline caused by a branch prediction miss generated, for example, at the time of loop termination. Thereby, an improvement in speed of the execution of a computer program is enabled.

According to the branch predictor of the present invention, since whether or not a branch is to be taken by a conditional branch instruction with which the judgement of loop termination is made is predicted in accordance with the value of a loop trip count, as mentioned above, it is possible to accurately predict a branch at the time of loop termination in the conditional branch instruction with which the judgement of loop termination is made.

DESCRIPTION OF THE PREFERRED EMBODIMENTS

In the following, description will be made of an embodiment of a branch predictor in which whether or not a branch is to be taken in a conditional branch instruction making the judgement of loop termination is predicted in accordance with a loop trip count, that is, the number of times a loop is executed or iterated.

Figure 1:
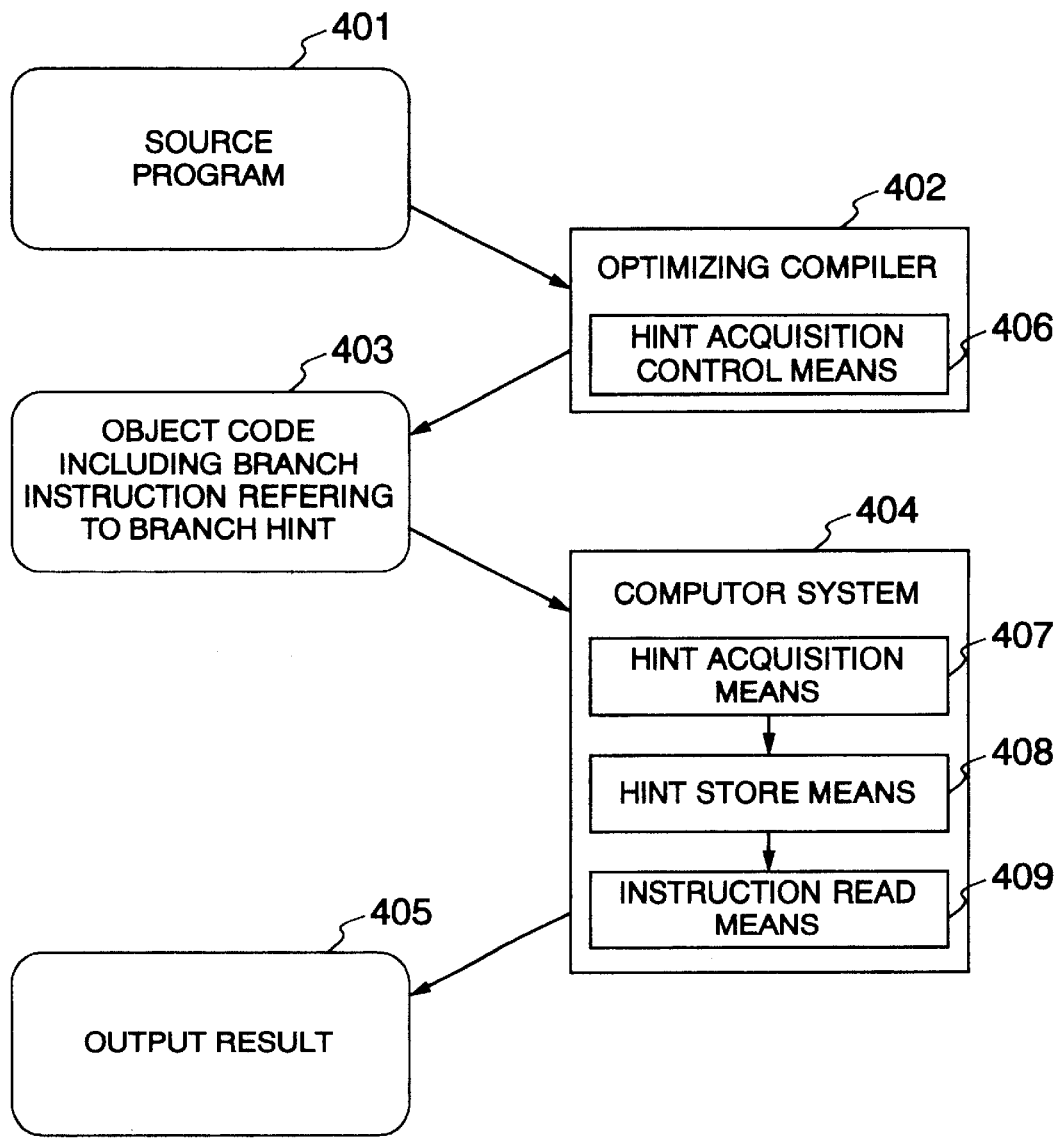
FIG. 1 is a diagram showing the outline of a processing performed by a computer system provided with a branch predictor.

FIG. 1 is a diagram showing the outline of a processing performed by a computer system provided with the branch predictor according to the present embodiment. As shown in FIG. 1, the computer system provided with the branch predictor according to the present embodiment generates an object code 403 executable at a high speed by compiling a source program 401 by use of an optimizing compiler 402 to make the accurate branch prediction, and outputs the result of execution 405.

The optimizing compiler 402 includes hint acquisition control means 406 for controlling the acquisition of a hint indicating whether or not a branch is to be taken by the execution of a loop termination judging conditional branch instruction as a conditional branch instruction with which the judgement of loop termination is made.

The computer system 404 includes hint acquisition means 407 for acquiring a hint when a specified instruction is executed, hint store means 408 for storing the hint acquired by the hint acquisition means 407, and instruction read means 409 for reading an instruction predicted as executed next to a conditional branch instruction in accordance with the hint stored in the hint store means 407.

The loop termination judging conditional branch instruction hereinafter referred to represents a special conditional branch instruction with which the prediction of whether or not a branch is to be taken is made in accordance with the value of a hint bit in a branch hint table added by the branch predictor in the present embodiment or a conditional branch instruction with which the judgement of loop termination is made.

Figure 2:
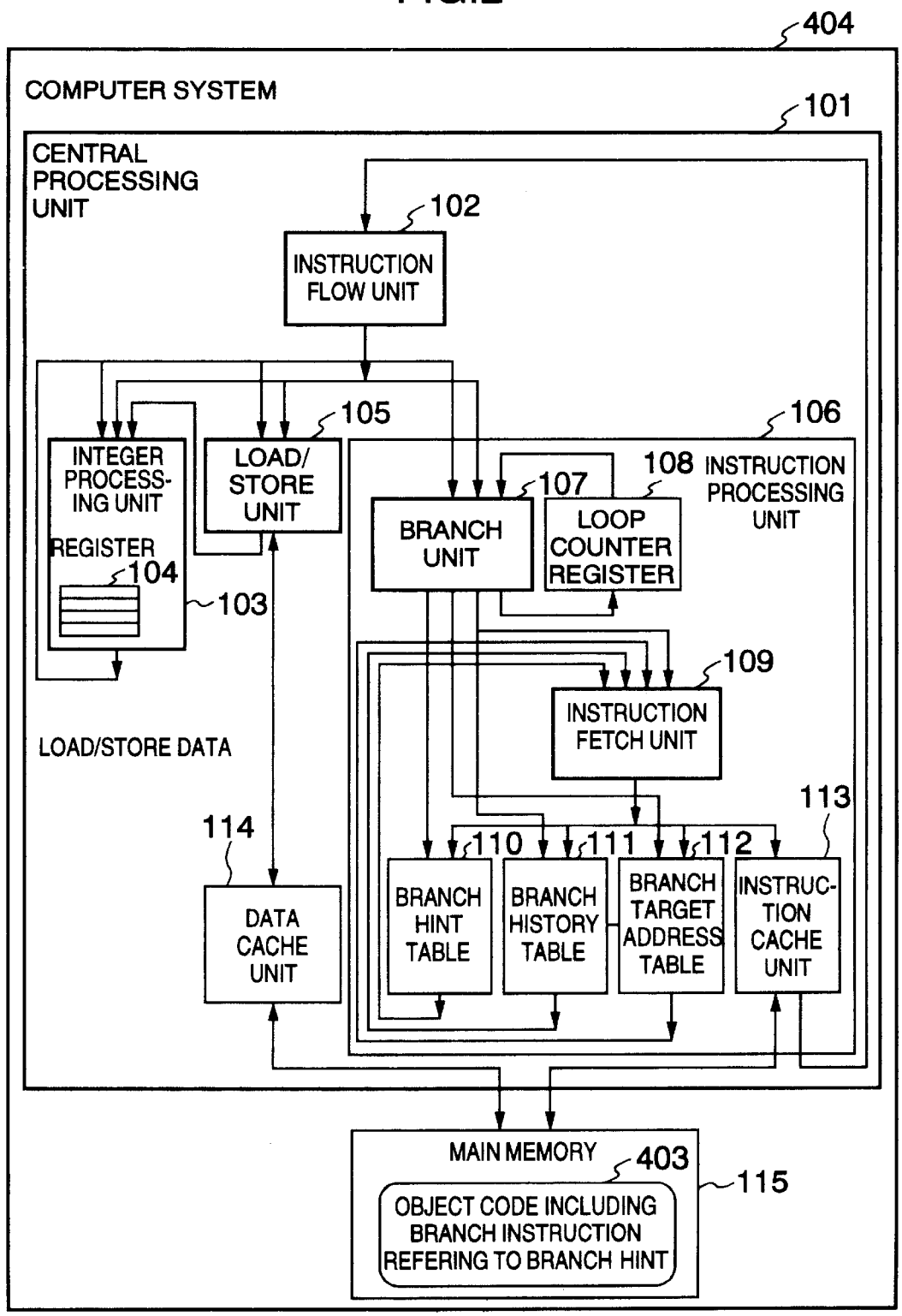
FIG. 2 is a diagram showing the schematic construction of the computer system 404.

FIG. 2 is a diagram showing the schematic construction of the computer system 404 in the present embodiment. As shown in FIG. 2, the computer system 404 in the present embodiment includes a main memory 115 for storing an object code 403 capable of being executed at a high speed, and a central processing unit 101 for executing the object code 403. A branch unit 107 corresponds to the hint acquisition means 407 for acquiring a hint indicating whether or not a branch is to be taken by a loop termination judging conditional branch instruction, a branch hint table 110 corresponds to the hint store means 408 for storing the hint, and an instruction fetch unit 109 corresponds to the instruction read means 409 for reading an instruction predicted as executed next to a conditional branch instruction in accordance with the hint. These units or means form the branch predictor.

The central processing unit 101 is composed of an instruction flow unit 102 for reading an instruction to assign the instruction to each unit for each kind of the instruction, an integer processing unit 103 for performing an integer processing and storing the result of processing into a register 104, a load/store unit 105 for performing the reading and writing of data for the register 104, an instruction processing unit 106 for performing a processing for a branch instruction and a request for and the output of an instruction to be next executed, and a data cache unit 114 for performing the storage of data referred to by the execution of an instruction and a processing for the reading and writing for the main memory 115. Each of these units is formed by an electronic circuit.

The instruction processing unit 106 includes the branch unit 107 for performing a processing for execution of an instruction in which a branch may be generated and outputting some of a branch target address, a branch result signal, a loop counter update value and a branch hint update value in accordance with the result of processing, and a loop counter register (CTR) 108 initially recorded with a loop trip count. The value of the loop counter register 108 is decremented for each loop iteration and takes "0" at the time of loop termination.

Also, the instruction processing unit 106 includes the instruction fetch unit 109 for generating the address of an instruction to be next executed, a branch history table 111 recorded with an address at which a conditional branch instruction exists and a history which indicates whether or not a branch was taken at the time of previous execution, a branch target address table 112 recorded with the address of a branch instruction and a branch target address therefor, and an instruction cache unit 113 for performing the storage of an instruction to be executed and the reading and writing for the main memory 115.

The instruction processing unit 106 further includes the branch hint table 110 which is a characteristic mechanism in the branch predictor according to the present embodiment and is recorded with the address of an executed loop termination judging conditional branch instruction and a hint indicating the prediction of whether or not a branch is to be taken at the time of next execution of that loop termination judging conditional branch instruction. When an address is inputted to the branch hint table 110, the corresponding hint can be read therefrom.

The branch hint table 110 is a table which has the address of a loop termination judging conditional branch instruction and a hint bit field for storing information indicating whether or not a branch is to be taken when the loop termination judging conditional branch instruction at that address is next executed. When the address of a specified loop termination judging conditional branch instruction is inputted, the branch hint table 110 outputs the value of the corresponding hint bit field.

Figure 3:
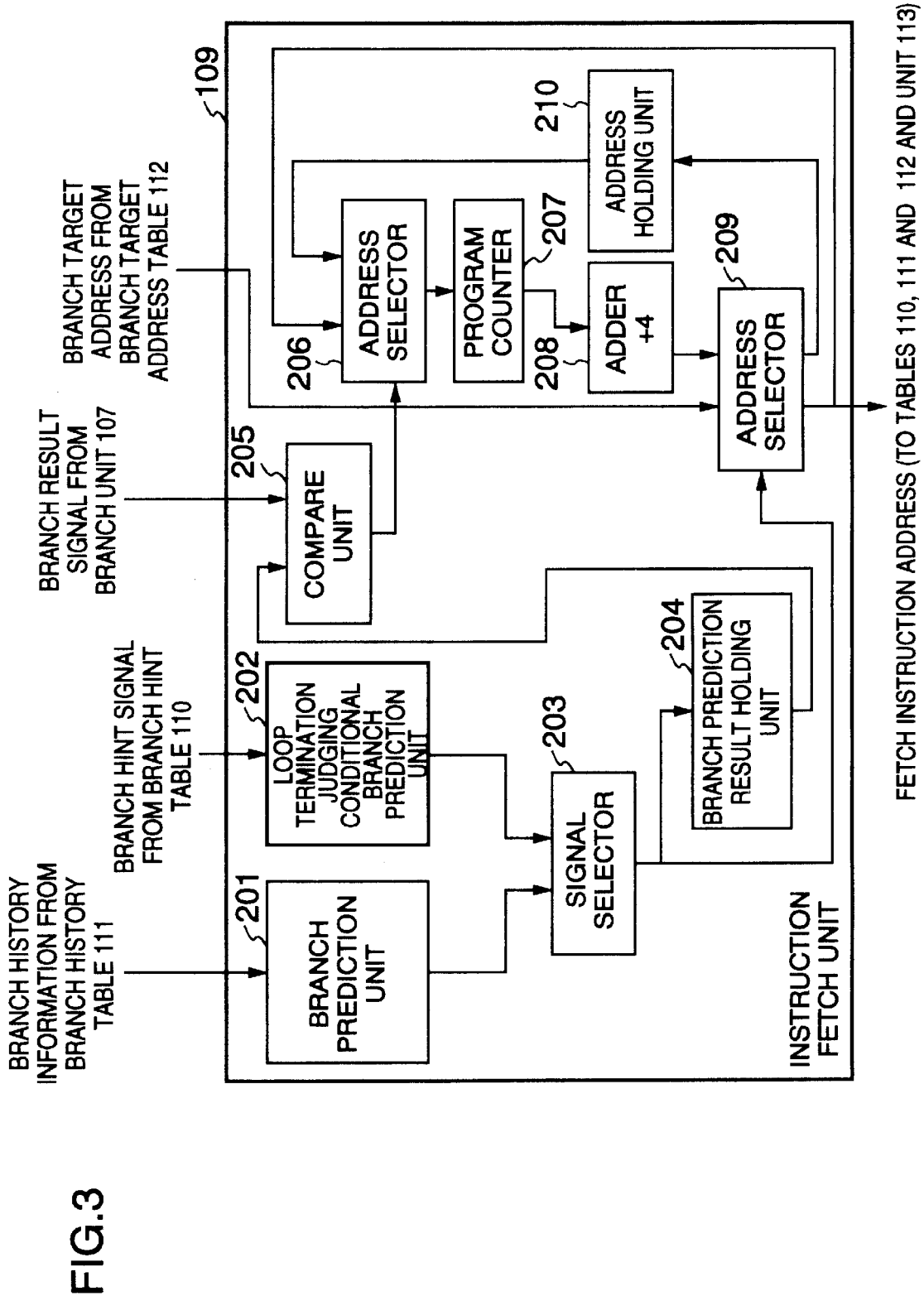
FIG. 3 is a diagram showing the details of an instruction fetch unit 109.

FIG. 3 is a diagram showing the details of the instruction fetch unit 109 in the present embodiment. As shown in FIG. 3, the instruction fetch unit 109 in the present embodiment has a branch prediction unit 201 for predicting the presence of branch generation from branch history information stored in the branch history table 111, and a loop termination judging conditional branch prediction unit 202 which is a characteristic mechanism in the branch predictor according to the present embodiment and outputs a branch prediction signal corresponding to a hint concerning the presence of branch generation recorded in the branch hint table 110.

Also, the instruction fetch unit 109 has a signal selector 203 for selectively delivering that one of an output from the branch prediction unit 201 and an output from the loop termination judging conditional branch prediction unit 202 which is on the signal sending side, a branch prediction result holding unit 204 for storing the result of branch prediction in order to verify whether or not the branch prediction result is equal to an operation at the time of actual execution, and an address selector 209 for selecting whether there is to be taken as the address of the next fetch instruction a branch target address or the address of the next instruction which succeeds the address of an instruction under execution indicated by a program counter 207 (that is, an address obtained by passing an output of the program counter 207 through an adder 208 in which "4" corresponding to the length of one instruction is added to the address held by the program counter 207), the selection being made in accordance with the branch prediction result.

The instruction fetch unit 109 further has an address holding unit 210 for storing an address subjected to no selection as the fetch instruction address in order to provide against the case where the branch prediction results in a miss, a compare unit 205 for checking whether or not the branch prediction results in a hit, and an address selector 206 for selecting whether there is to be used as an address for the updating of the program counter 207 an address stored in the address holding unit 210 or an address selected by the address selector 209, the selection being made in accordance with the result of check or comparison.

Figure 4:
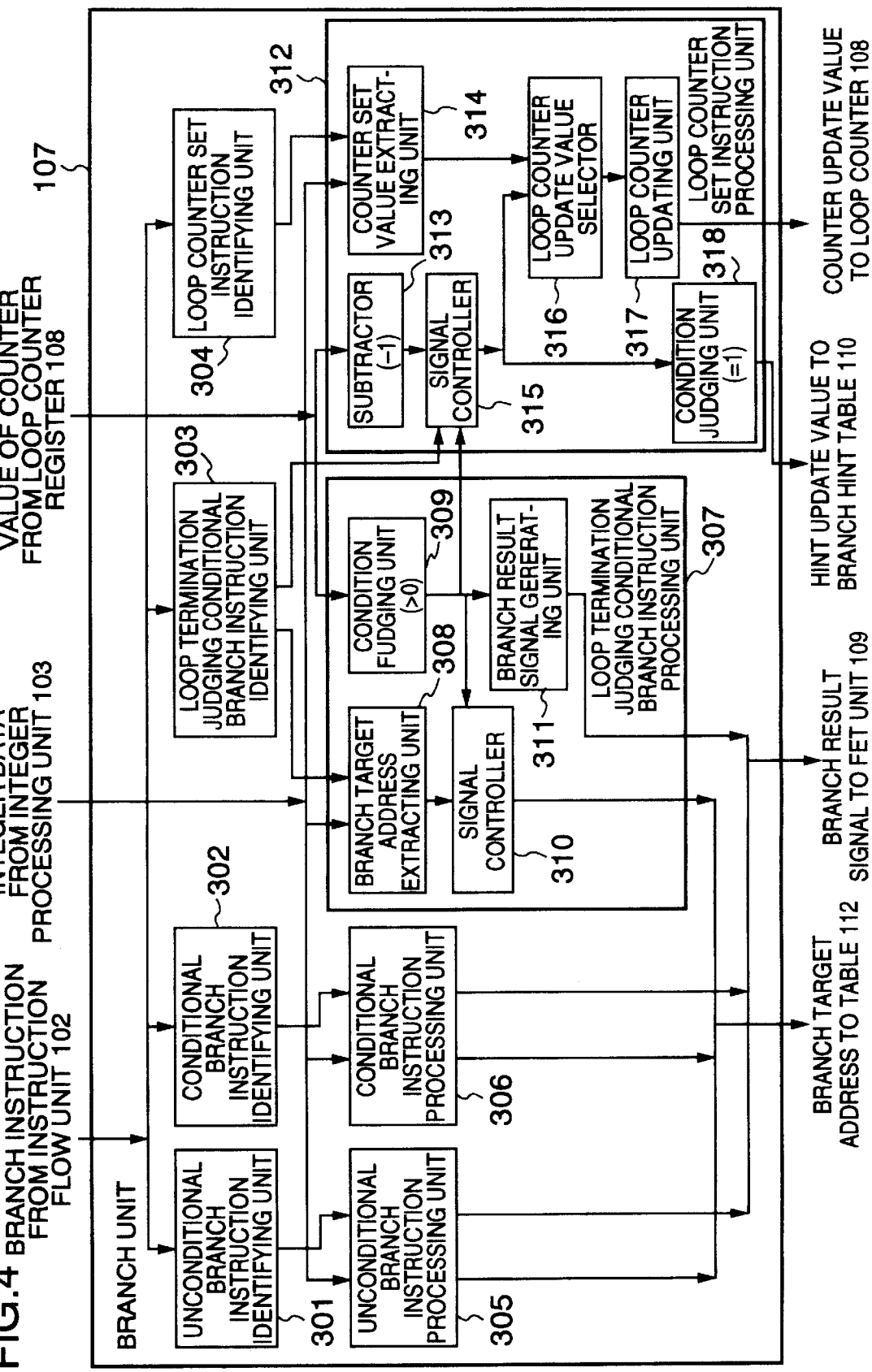
FIG. 4 is a diagram showing the details of a branch unit 107.

FIG. 4 is a diagram showing the details of the branch unit 107 in the present embodiment. As shown in FIG. 4, the branch unit 107 in the present embodiment performs processings for an unconditional branch instruction, a conditional branch instruction, a loop termination judging conditional branch instruction and a loop counter set instruction.

The branch unit 107 has an unconditional branch instruction identifying unit 301, a conditional branch instruction identifying unit 302, a loop termination judging conditional branch instruction identifying unit 303 and a loop counter set instruction identifying unit 304 which identify the kinds of the above-mentioned instructions, respectively.

Also, the branch unit 107 has an unconditional branch instruction processing unit 305 for examining an unconditional branch instruction sent thereto, obtaining a branch target address from the instruction or the value of the register 104 sent from the integer processing unit 103, and outputting the obtained branch target address and a branch result signal indicative of the generation of a branch simultaneously, and a conditional branch instruction processing unit 306 for examining a conditional branch instruction sent thereto and examining whether or not the value of the register 104 sent from the integer processing unit 103 satisfies a condition, so that a branch target address obtained from the instruction or the value of the register 104 sent from the integer processing unit 103 and a branch result signal indicative of the generation of a branch are outputted by the unit 306 in the case where the condition is satisfied and a branch result signal indicative of the generation of no branch is outputted by the unit 306 in the case where the condition is not satisfied.

The branch unit 107 further has a loop termination judging conditional branch instruction processing unit 307 which is a characteristic mechanism in the branch predictor according to the present embodiment and which examines the presence of branch generation on the basis of the value of the loop counter register 108 so that a branch target address obtained from the instruction or the value of the register 104 sent from the integer processing unit 103 and a branch result signal indicative of the generation of a branch are outputted by the unit 307 in the case where a branch was generated and a branch result signal indicative of the generation of no branch is outputted by the unit 307 in the case where no branch was generated, and a loop counter set instruction processing unit 312 which is a characteristic mechanism in the branch predictor according to the present embodiment and which performs the operation of the loop termination judging conditional branch instruction and the updating of the value of the loop counter register 108 by the loop counter set instruction.

The loop termination judging conditional branch instruction processing unit 307 includes a branch target address extracting unit 308 for obtaining a branch target address from the instruction or the value of the register 104 sent from the integer processing unit 103, a condition judging unit 309 for judging whether or not the value of the loop counter register 108 is larger than "0", so that a signal indicating that a branch is to be taken is outputted by the unit 309 in the case where the result of judgement is true, a signal controller 310 for controlling whether or not the branch target address outputted by the branch target address extracting unit 308 is to be outputted from the unit 310, the control being made in accordance with the truth/falseness of the result of judgement by the condition judging unit 309, and a branch result signal generating unit 311 for generating a branch result signal indicative of the generation of a branch or the generation of no branch in accordance with the truth/falseness of the result of judgement by the condition judging unit 309.

The loop counter set instruction processing unit 312 includes a subtractor 313 for subtracting "1" from the value of the loop counter register 108 each time a loop is iterated, a counter set value extracting unit 314 for obtaining a value to be set to the loop counter from the instruction or the value of the register 104 sent from the integer processing unit 103, and a signal controller 315 for delivering an output of the subtractor 313 only in the case where a loop termination judging conditional branch instruction is executed and a branch is generated.

Also, the loop counter set instruction processing unit 312 includes a loop counter update value selector 316 for delivering a value outputted from the signal controller 315 when a branch is generated by a loop termination judging conditional branch instruction and delivering a value obtained by the counter set value extracting unit 314 when the case is not so, and a loop counter updating unit 317 for updating the value of the loop counter register 108 into a value selected by the loop counter update value selector 316.

The loop counter set instruction processing unit 312 further includes a condition judging unit 318 for judging whether or not a value outputted by the signal controller 315 is "1", so that a branch hint table update value indicating that a branch is not to be taken at the next execution of the loop termination judging conditional branch instruction is outputted by the unit 318 in the case where the result of judgement is true and a branch hint table update value indicating that a branch is to be taken at the time of next execution of the loop termination judging conditional branch instruction is outputted by the unit 318 in the case where the result of judgement is false.

Figure 5:
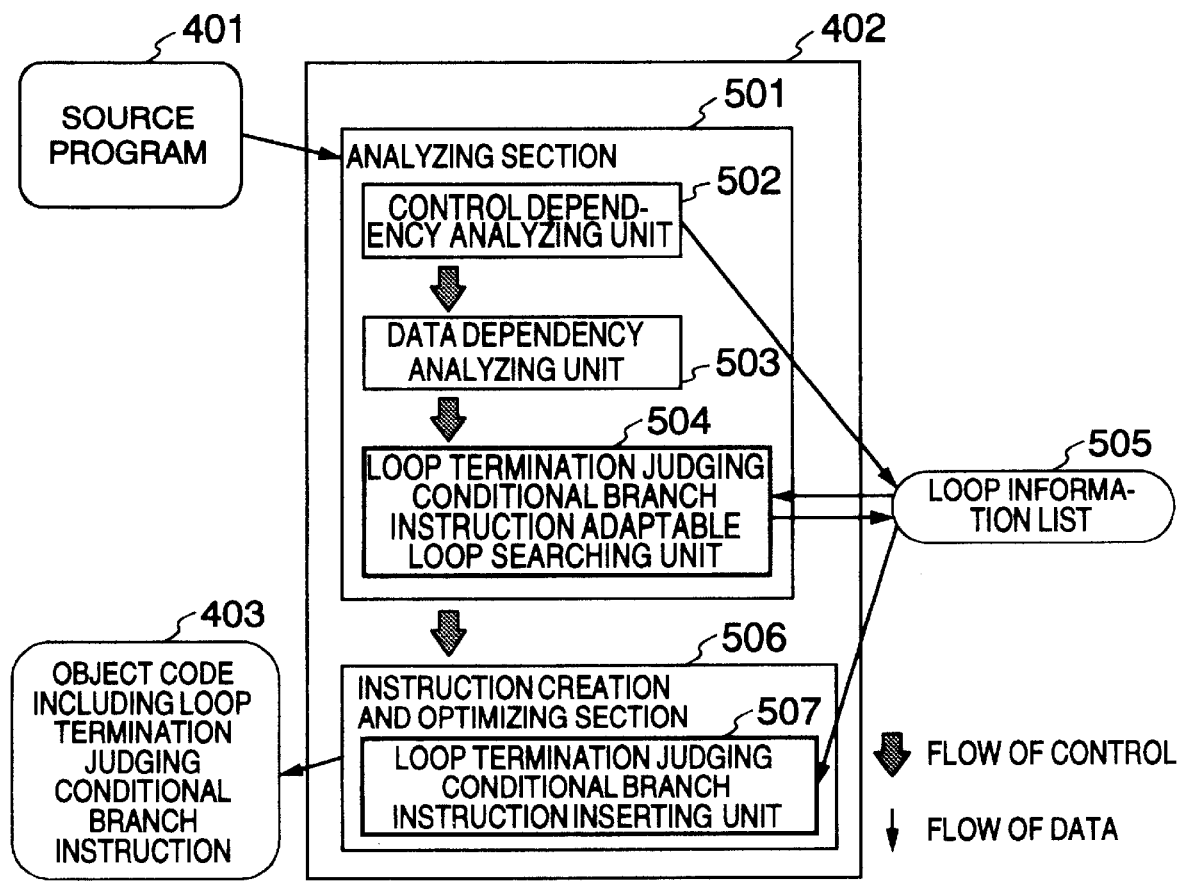
FIG. 5 is a diagram showing an example of the construction of an optimizing compiler 402.

FIG. 5 is a diagram showing an example of the construction of the optimizing compiler 402 in the present embodiment. As shown in FIG. 5, the optimizing compiler 402 in the present embodiment includes an analyzing section 501 for examining the structure of a program to collect and record various information necessary for instruction creation and optimization, and an instruction creation and optimizing section 506 for performing a processing for instruction creation and optimization on the basis of the information collected by the analyzing section 501.

A loop termination judging conditional branch instruction adaptable loop searching unit 504 and a loop termination judging conditional branch instruction inserting unit 507 correspond to the hint acquisition control means 406 for controlling the acquisition of a hint indicating whether or not a branch is taken by the execution of a loop termination judging conditional branch instruction. The optimizing compiler 402 as a program for causing the computer system 404 to function as the hint acquisition control means 406 is recorded in a recording medium such as a hard disk, a magnetic tape or the like and is thereafter loaded into the main memory 115 so that it is executed by the computer system 404.

In the analyzing section 501, information required at the time of application of the branch predictor of the present embodiment is collected by a control dependency analyzing unit 502 and a data dependency analyzing unit 503.

The control dependency analyzing unit 502 makes the identification of a loop location or portion in the program on the basis of control dependency analysis, and the data dependency analyzing unit 503 makes the analysis inclusive of the specification of a loop trip count on the basis of data dependency analysis. The results of analysis are recorded into a loop information list 505.

For these analyses may be used a known technique as disclosed by, for example, Michael Wolfe, "HIGH PERFORMANCE COMPUTERS FOR PARALLEL COMPUTING", pp. 200–201, Addison-Wesley Publishing Company 1996, ISBN 0-8053-2730-4.

The loop termination judging conditional branch instruction adaptable loop searching unit 504, which is a characteristic processing unit in the compiler backend, makes the successive trace of information concerning each loop recorded in the loop information list 505 so that a loop capable of being executed at a high speed is identified through analysis using the loop termination judging conditional branch instruction. The result is recorded into the loop information list 505.

The instruction creation and optimizing section 506 performs a processing for optimization from information obtained by the analyzing section 501 to generate an object code 404 capable of being executed at a high speed.

The loop termination judging conditional branch instruction inserting unit 507 in the processing section 506 forms a characteristic processing unit which the branch predictor of the present embodiment is applied. The unit 507 inserts a CTR set instruction for the setting of a loop trip count to the loop counter register and a loop loop termination judging conditional branch instruction into a loop termination judging conditional branch instruction adaptable loop recorded in the loop information list 505.

Now, the generation of the high-speed executable object code 403 and an example of prediction at the time of execution of the object code will be described along the flow shown in FIG. 1.

Figure 6:
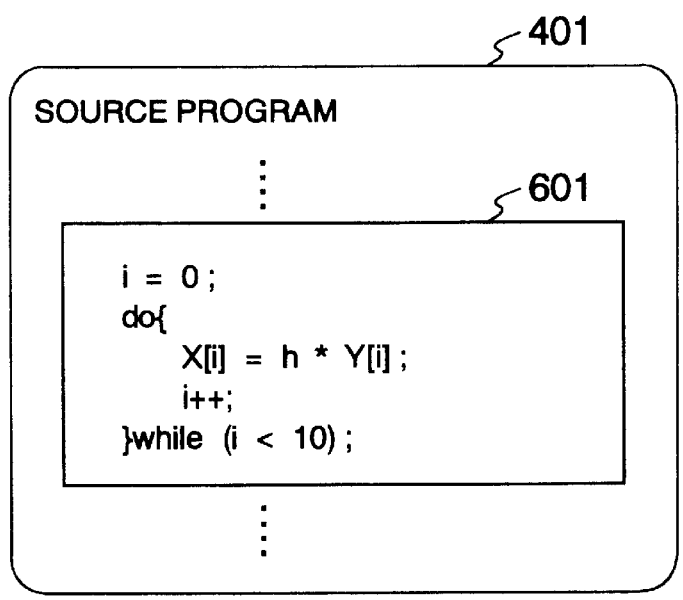
FIG. 6 is a diagram showing an example of a source program 401.

FIG. 6 is a diagram showing an example of the source program 401 in the present embodiment. As shown in FIG. 6, the source program 401 in the present embodiment has a program fragment 601 including a loop which is iteratively executed ten times. The following description will be made taking this program fragment 601 as an example.

The optimizing compiler 402 first makes the control dependency analysis of the source program 401 by the control dependency analyzing unit 502 to generate a loop information list 505.

Figure 7:
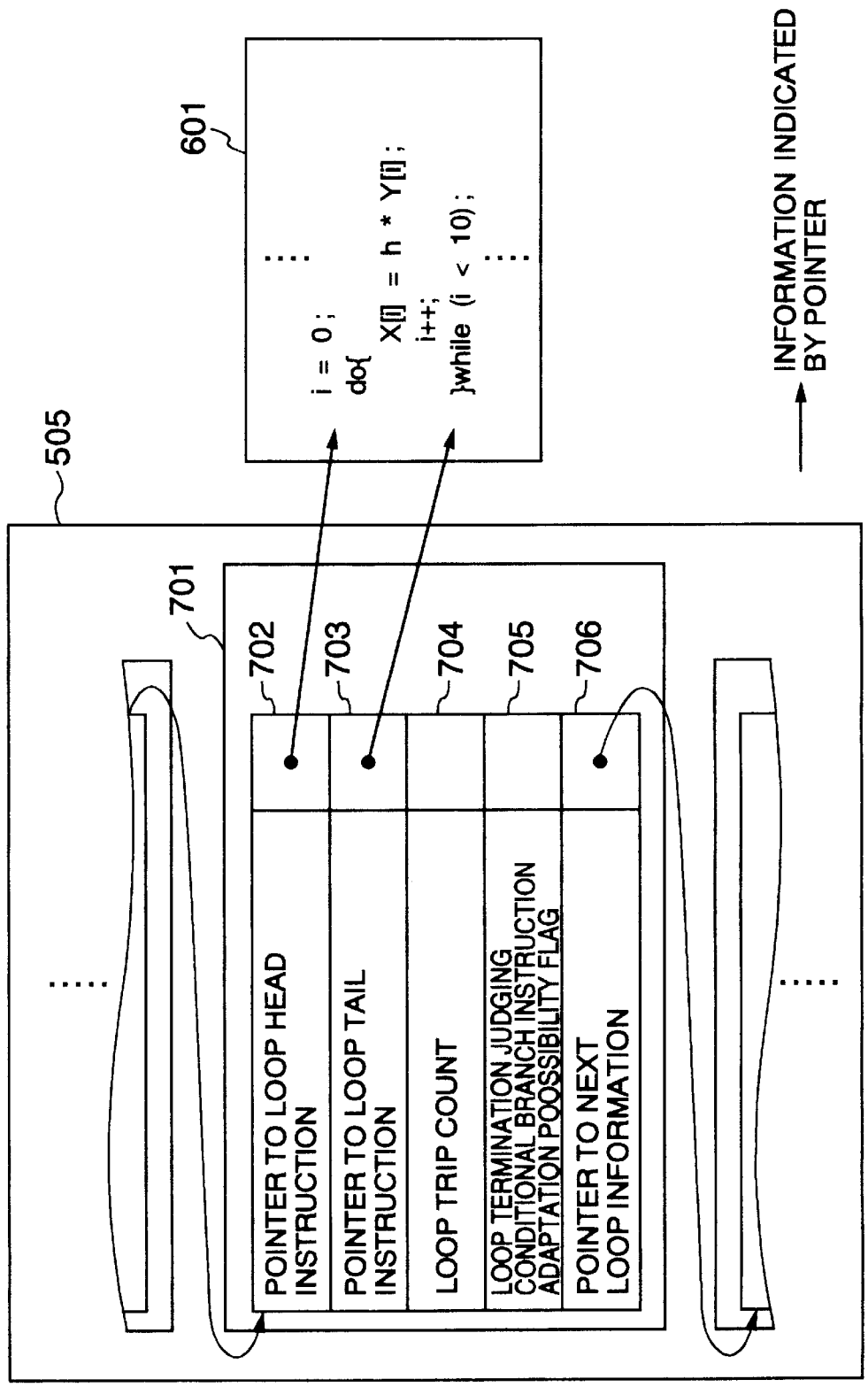
FIG. 7 is a diagram showing an example of the data structure of a loop information list 505.

FIG. 7 is a diagram showing an example of the data structure of the loop information list 505 in the present embodiment. As shown in FIG. 7, the loop information list 505 in the present embodiment has a list structure with the node of a loop information entry 701 corresponding to each loop. The loop information entry 701 has information which includes a pointer to loop head instruction field 702, a pointer to loop tail instruction field 703, a loop trip count field 704, a loop termination judging conditional branch instruction adaptation possibility flag 705 indicating whether or not the loop is a loop for which a loop termination judging conditional branch instruction is adaptable, and a pointer to next information entry field 706.

The pointer to loop head instruction field 702 and the pointer to loop tail instruction field 703 hold, for example, pointers to instructions at portions of the program fragment 601 indicated by arrows in FIG. 7.

The loop termination judging conditional branch instruction adaptable loop searching unit 504 uses a loop termination judging conditional branch instruction to search for a high-speed executable loop by making the successive trace of loop information entries 701 included in the loop information list 505 to check whether or not loop trip count information is registered.

Figure 8:
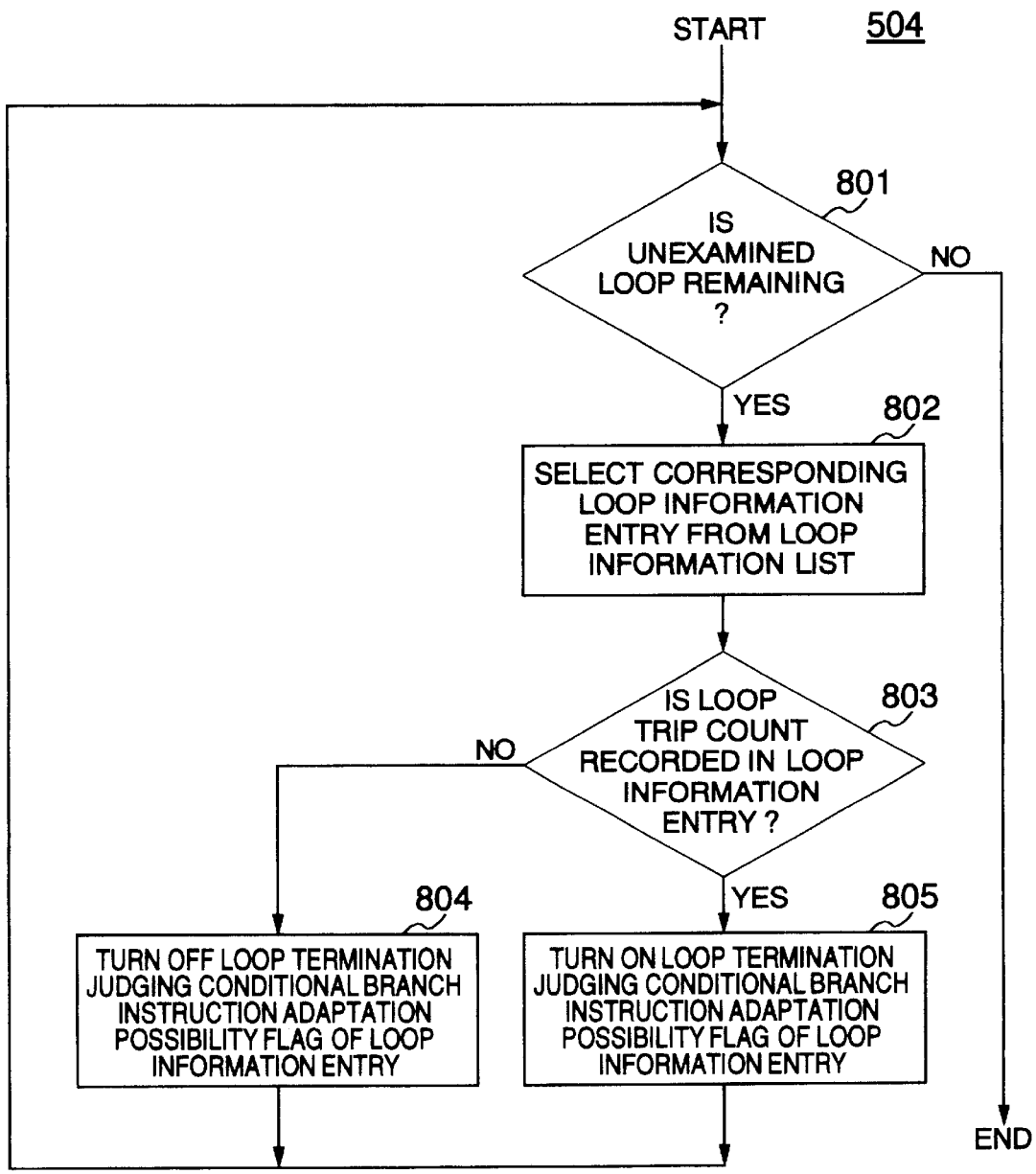
FIG. 8 is a flow chart showing the procedure of a processing performed by a loop termination judging conditional branch instruction adaptable loop searching unit 504.

FIG. 8 is a flow chart showing the procedure of a processing performed by the loop termination judging conditional branch instruction adaptable loop searching unit 504 in the present embodiment. As shown in FIG. 8, the loop termination judging conditional branch instruction adaptable loop searching unit 504 in the present embodiment first examines whether or not the loop information list 505 includes a loop which has not yet been subjected to the examination of whether or not the adaptation is possible (step 801). In the case where an unexamined loop is not remaining, the processing is completed. If an unexamined loop is remaining, a loop information entry 701 of the unexamined loop 701 is extracted from the loop information list 505 (step 802).

Next or in step 803, the examination of whether or not a loop trip count is recorded in the loop trip count field 704 of the extracted loop information entry 701 is made to check whether or not the value of the loop trip count has already been specified. In the case where the loop trip count has already been specified, the loop termination judging conditional branch instruction adaptation possibility flag 705 in the loop information entry 701 is turned on judging the loop termination judging conditional branch instruction as being adaptable (step 805) and thereafter, the flow returns to step 801. In the case where the loop trip count has not yet been specified, the loop termination judging conditional branch instruction adaptation possibility flag 705 in the loop information entry 701 is reset judging the loop termination judging conditional branch instruction as being not adaptable (step 804) and thereafter the flow returns to step 801.

After the processing by the loop termination judging conditional branch instruction adaptable loop searching unit 504 is completed for all loop information entries 701 included in the loop information list 505, the loop termination judging conditional branch instruction inserting unit 507 of the instruction creation and optimizing section 506 examines all loop information entries 701 included in the loop information list 505 to insert, for a loop termination judging conditional branch instruction adaptable loop, a CTR set instruction into its loop head and a loop termination judging conditional branch instruction into its loop tail.

Figure 9:
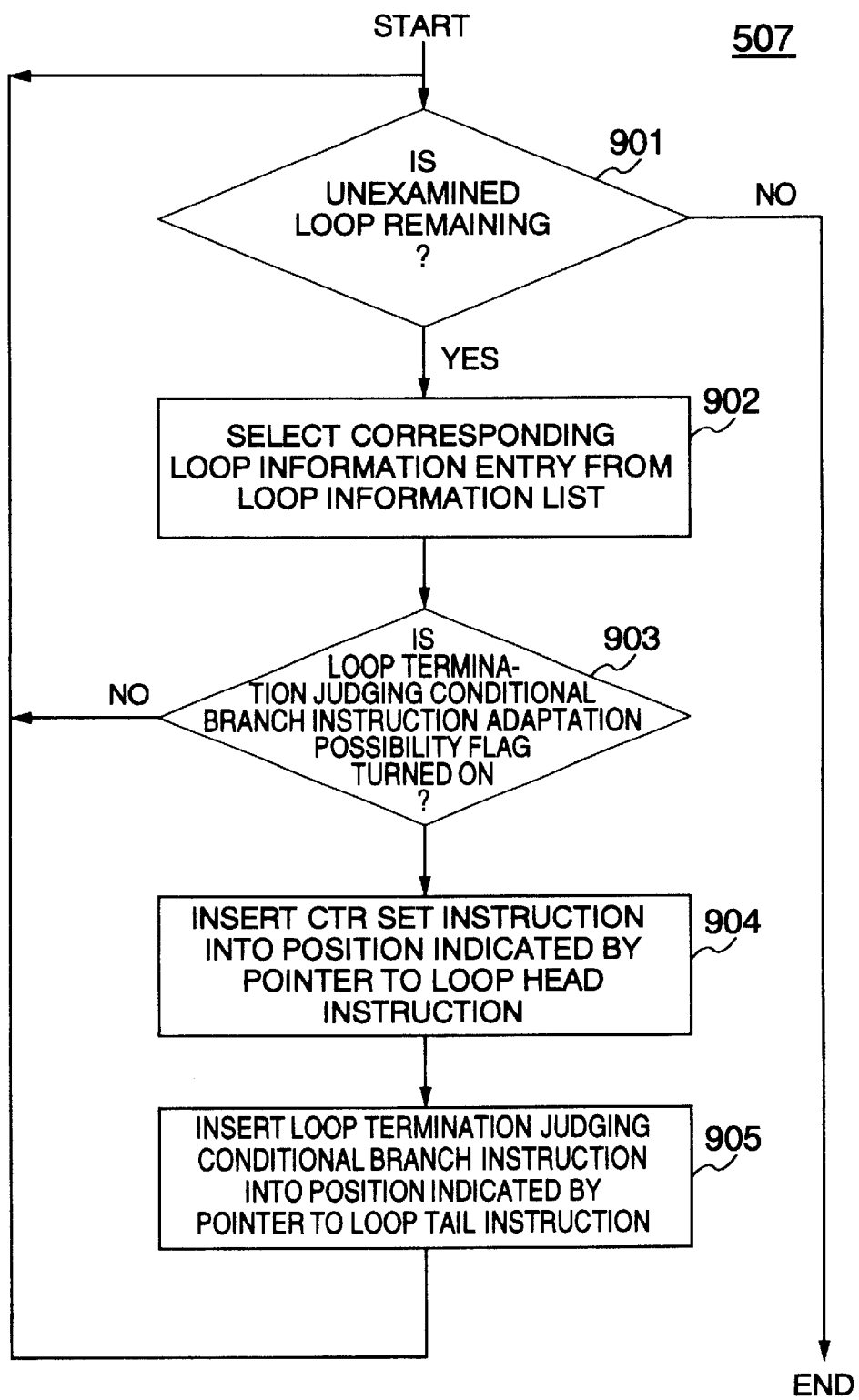
FIG. 9 is a flow chart showing the procedure of a processing performed by a loop termination judging conditional branch instruction inserting unit 507.

FIG. 9 is a flow chart showing the procedure of a processing performed by the loop termination judging conditional branch instruction inserting unit 507 in the present embodiment. As shown in FIG. 9, the loop termination judging conditional branch instruction inserting unit 507 in the present embodiment first searches for a loop in which a loop termination judging conditional branch instruction is not inserted (step 901). In the case where there is not such a loop, the processing is completed. In the case where there is a loop in which a loop termination judging conditional branch instruction is not inserted, the corresponding loop information entry 701 is selected from the loop information list 505 (step 902).

In step 903, the selected loop information entry 701 is examined. In the case where the loop termination judging conditional branch instruction adaptation possibility flag 705 is turned on, a CTR set instruction is inserted into a position indicated by a pointer stored in the pointer to loop head instruction field 702 (step 904) and a loop termination judging conditional branch instruction is thereafter inserted into a position indicated by a pointer stored in the pointer to loop tail instruction field 703 (step 905).

In the case where the examination of the loop information entry 701 in step 903 results in that the loop termination judging conditional branch instruction adaptation possibility flag 705 is not turned on, the flow returns to step 901.

Figure 10:
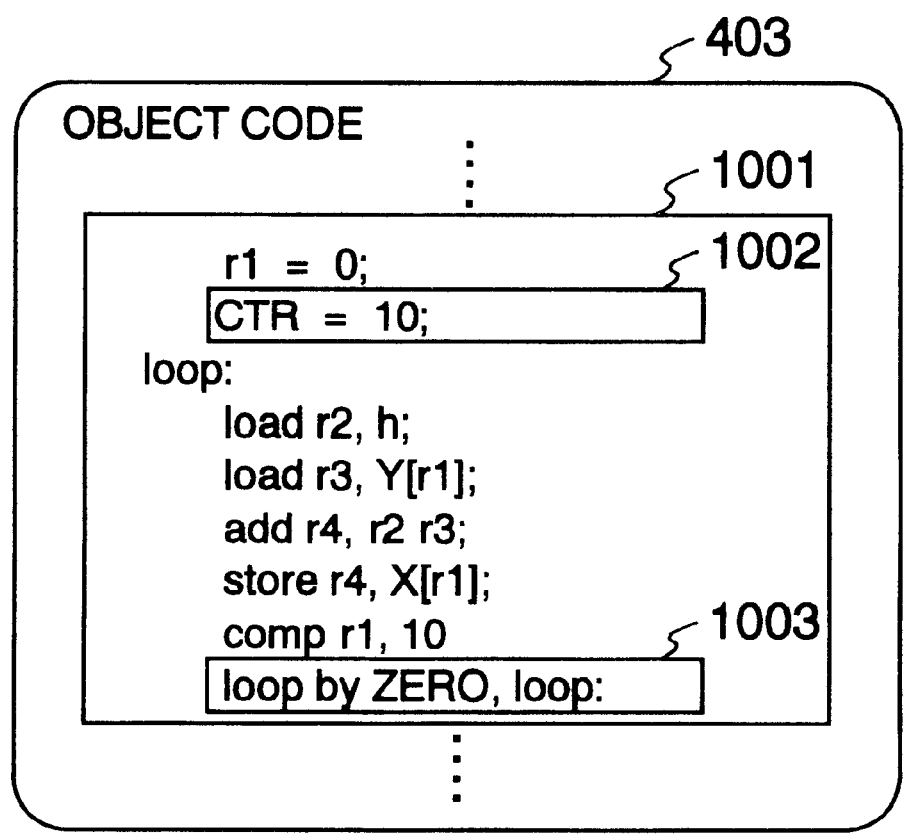
FIG. 10 shows an example of an object code.

FIG. 10 is a diagram showing an example of the object code 403 in the present embodiment. As shown in FIG. 10, the object code 403 in the present embodiment includes an object code fragment 1001 corresponding to the program fragment 601 shown in FIG. 6. A CTR set instruction 1002 and a loop termination judging conditional branch instruction 1003 are inserted in the object code fragment 1001.

The loop termination judging conditional branch instruction 1003 inserted by the loop termination judging conditional branch instruction inserting unit 507 is a conditional branch instruction having a form in which information indicating that a hint is to be acquired at the time of execution of a conditional branch instruction is held. Namely, it is shown that the loop termination judging conditional branch instruction 1003 inserted in the object code 403 is a conditional branch instruction with which a hint indicating that a branch is to be taken at the time of next execution is acquired at the time of execution in the branch unit 107.

Next, description will be made of an example of the operation in the case where the object code fragment 1001 is executed by the computer system 404. Particularly, the description will be made in conjunction with the case where the CTR set instruction 1002 and the loop termination judging conditional branch instruction 1003 included in the object code fragment 1001 stored in the main memory 115 are executed.

When the address of the CTR set instruction 1002 is sent from the instruction fetch unit 109 to the instruction cache unit 113 as the address of an instruction to be executed, the CTR set instruction 1002 after read into the instruction cache unit 113 in the case where it has not yet been read from the main memory 115 to the instruction cache unit 113 or the CTR set instruction 1002 existing in the instruction cache unit 113 in the case where it has already been read in the instruction cache unit 113 is sent to the instruction flow unit 102. The flow from the main memory 115 to the instruction flow unit 102 is similar for the execution of each of all instructions.

First, consider the execution of the CTR set instruction 1002 shown in FIG. 10. In the shown example, the CTR set instruction 1002 indicates that "10" is to be set to the loop counter register 108. A processing for execution of the CTR set instruction 1002 is assigned by the instruction flow unit 102 to the branch unit 107 in the instruction processing unit 106.

In the branch unit 107, the CTR set instruction 1002 is identified by the loop counter set instruction identifying unit 304 and "10" as the counter set value is acquired by the counter set value extracting unit 314.

The acquired counter set value is sent to the loop counter update value selector 316. Though the selection of either a value from the subtractor 313 or a counter set value from the counter set value extracting unit 314 is made by the loop counter update value selector 316, it is assumed that in the case where a value is sent from the counter set value extracting unit 314, the counter set value is preferentially selected. The selected value is sent to the loop counter updating unit 317 by which a value held in the loop counter register is updated.

In a manner overlapping the processing in the instruction processing unit 106, the instruction fetch units 109 performs a processing for generation of the address of an instruction to be next executed.

The CTR set instruction 1002 is an instruction with which no branch is generated. Therefore, even if the address of the CTR set instruction is outputted from the instruction fetch unit 109, there is no input from the branch hint table 110 and the branch target address table 112 to the instruction fetch unit 109. Accordingly, the signal selector 203 outputs a signal indicating that no branch is to be generated. As a result, the address selector 209 inputted with only an address obtained by adding an instruction length corresponding to one instruction by the adder 208 to the address of an instruction under execution held by the program counter 207 outputs this inputted address as the next instruction address.

Next, consider the case where the body of a loop is executed after the execution of the CTR set instruction 1002 and the loop termination judging conditional branch instruction 1003 is executed at the time of iterative loop execution. It is assumed that the loop is to be iterated at least two times after the execution of the loop termination judging conditional branch instruction 1003 and the loop termination judging conditional branch instruction 1003 has already been sent to the instruction flow unit 102.

The loop termination judging conditional branch instruction 1003 is assigned to the instruction processing unit 106 through the instruction flow unit 102 and is sent to the branch unit 107 in the instruction processing unit 106.

In the branch unit 107, the loop termination judging conditional branch instruction 1003 is identified by the loop termination judging conditional branch instruction identifying unit 303 and is sent to the branch target address extracting unit 308 which in turn obtains a branch target address from the instruction or a signal sent from the integer processing unit 103. At the same time, the signal controller 310 is inputted with a signal instructing the delivery of an output therefrom.

Simultaneously with this, the condition judging unit 309 reads the value of the loop counter register 108 to judge whether or not the read value is larger than "0". When the loop is iteratively executed, the value of the loop counter register 108 is larger than "0", that is, the condition is certainly satisfied. Therefore, a signal indicating that the condition is satisfied is sent to the signal controller 310, the branch result signal generating unit 311 and the signal controller 315.

When the condition satisfaction signal is received, the signal controller 310 outputs the branch target address and the branch result signal generating unit 311 outputs a branch result signal or a signal indicative of the generation of a branch to the instruction fetch unit 109.

When an output request signal from the loop termination judging conditional branch instruction identifying unit 303 and the condition satisfaction signal from the condition judging unit 309 are received, the signal controller 315 delivers an output from the subtractor 313 or a value obtained by subtracting "1" from the value of the loop counter register 108. The loop counter update value selector 316 receiving this value sends the received value as an update value for the loop counter register 108 to the loop counter updating unit 317. As a result, the value of the loop counter register 108 is updated.

The output from the signal controller 315 is also sent to the condition judging unit 318. The condition judging unit 318 judges whether or not the value outputted from the signal controller 315 is "1". Since it is assumed that the loop is to be iterated at least two times hereafter, the result of judgement by the condition judging unit 318 is certain to be false. Therefore, the value of a hint indicating that a branch is to be generated in the case where this loop termination judging conditional branch instruction 1003 is next executed, is outputted from the condition judging unit 318 to the branch hint table 110.

When the branch hint update value is received, the branch hint table 110 takes the matching of the corresponding information of the loop termination judging conditional branch instruction 1003 in the table with the received branch hint update value on the basis of the address of the loop termination judging conditional branch instruction 1003 to update the corresponding value in the branch hint table 110.

In a manner overlapping the processing by the branch unit 107 in the instruction processing unit 106, the instruction fetch units 109 performs a processing for generation of the address of an instruction to be next executed.

When the address of the loop termination judging conditional branch instruction 1003 is inputted from the instruction fetch unit 109, the branch hint table 110 and the branch target address table 112 send a branch hint and a branch target instruction address, respectively, to the instruction fetch unit 109 so far as the corresponding information exists at the received address. The branch history table 111 is recorded with only the operation history of a conditional branch instruction and has no entry of the loop termination judging conditional branch instruction 1003. Therefore, the branch history table 111 sends no value to the instruction fetch unit 109 even if the address of the loop termination judging conditional branch instruction 1003 is inputted from the instruction fetch unit 109.

During iterative loop operation, a branch hint signal indicating that a branch operation is to be performed is certainly sent from the branch hint table 110 excepting the first iteration. When the branch hint signal is received, the loop termination judging conditional branch prediction unit 202 outputs a branch prediction signal indicating that the branch operation is to be performed.

The outputted branch prediction signal is inputted to the signal selector 203 which selects either the branch prediction signal and an output from the branch prediction unit 201. Since there is no output from the branch prediction unit 201, the signal selector 203 outputs the inputted branch prediction signal as it is.

The branch prediction result or the output from the signal selector 203 is held by the branch prediction result holding unit 204 and is also sent to the address selector 209.

The address selector 209 selecting either a branch target address as one input information sent from the branch target address table 112 or an address as the other input information which is the address of an instruction succeeding the loop termination judging conditional branch instruction 1003 (that is, an address by adding the length of one instruction to the address of an instruction under now execution held in the program counter 207) selects that branch target address sent from the branch target address table 112 which is the address of a successor instruction in the case where a branch is taken.

The selected branch target address is outputted to the address selector 206 of the instruction fetch unit 109 for the updating of the program counter 207 so that the program counter 207 is updated. The address subjected to no selection by the address selector 209 is sent to the address holding unit 210 and is stored thereinto in order to provide against the case where the branch prediction results in a miss.

Next, consider the case where the loop termination judging conditional branch instruction 1003 is executed at the time of last but one loop iteration preceding the loop termination.

This case is different from the case of iterative loop execution in the result of judgement by the condition judging unit 318. Namely, the result of condition judgement is true so that the value of a hint indicating that no branch is to be generated in the case where the loop termination judging conditional branch instruction is next executed is outputted from the condition judging unit 318 to the branch hint table 110.

The branch hint table 110 receiving the branch hint update value takes the matching of the corresponding information of the loop termination judging conditional branch instruction 1003 in the table with the received branch hint update value on the basis of the address of the loop termination judging conditional branch instruction 1003 to update the corresponding value in the branch hint table 110.

Next, consider the case where the loop termination judging conditional branch instruction 1003 is executed at the time of loop termination.

This case is different from the case of iterative loop execution in that a hint sent from the branch hint table 110 to the instruction fetch unit 109 when after the generation of the address of the loop termination judging conditional branch instruction 1003, the address of the successor instruction is to be generated, is a hint indicating that no branch is to be taken. This is because the hint indicating that no branch is to be taken is written in the branch hint table 110 at the time of last but one loop iteration preceding the loop termination.

As a result, the address selector 209 selects as its output an address which is obtained by adding the length of one instruction by the adder 208 to an address held in the program counter 207. Accordingly, the correct fetch of the successor instruction becomes possible, thereby enabling the correct branch prediction at the time of loop termination. In the case where the branch prediction results in a miss, the prediction miss is detected by the compare unit 205 or by comparing the branch result signal sent from the branch unit 107 and the prediction result held in the branch prediction result holding unit 204 and hence an output from the address selector 206 takes that address subjected to no selection by the branch prediction which is held in the address holding unit 210. As a result, it is possible to return the value of the program counter 207 to a condition immediately after the branch.

According to the branch predictor of the present embodiment, since whether or not a branch is to be taken by a conditional branch instruction with which the judgement of loop termination is made is predicted in accordance with the value of a loop trip count, as described above, it is possible to accurately predict a branch at the time of loop termination in the conditional branch instruction with which the judgement of loop termination is made.

Though the present invention has specifically been described on the basis of the embodiment, it is of course that the present invention is not limited to the disclosed embodiment and various changes or modifications are possible within a scope which does not depart from the gist of the invention.

According to the present invention, since whether or not a branch is to be taken by a conditional branch instruction with which the judgement of loop termination is made is predicted in accordance with the value of a loop trip count, as described above, it is possible to accurately predict a branch at the time of loop termination in the conditional branch instruction with which the judgement of loop termination is made.

What is claimed is:

1. A branch predictor apparatus for predicting termination of a conditional branch instruction of a program to read the next instruction beforehand, comprising:

loop count means for counting the number of times a loop is performed until termination of the loop;

hint acquisition means for acquiring a hint indicating at least one iteration preceding the termination of the loop, when a specified instruction controlling acquisition of said hint is executed, wherein said hint indicates whether a branch is to be taken by execution of a conditional branch instruction with which termination of a loop is judged;

hint store means for storing the hint acquired by said hint acquisition means; and instruction read means for reading an instruction predicted as executed next to a conditional branch instruction in accordance with the hint stored in said hint store means.

2. A branch predictor according to claim 1, wherein when the conditional branch instruction with which termination of the loop is judged, is executed, said hint acquisition means examines whether or not an iteration of the loop is the last iteration preceding the termination of the loop, thereby judging whether or not the loop is to be terminated at the time of next loop iteration.

3. A branch predictor according to claim 1, wherein said hint acquisition means examines the value of a register in which a loop trip count is registered, thereby judging whether or not the loop is to be terminated.

4. A branch predictor according to claim 1, wherein said hint store means has a hint bit field corresponding to each condition branch instruction with which the termination of a loop is judged, said hint bit field being stored with a hint indicating whether or not a branch is to be taken by the execution of the corresponding conditional branch instruction.

5. A branch predictor apparatus according to claim 1, further comprising:

a memory having an object code including said conditional branch instruction with which termination of the loop is judged.

* * * * *